UNITED STATES PATENT OFFICE.

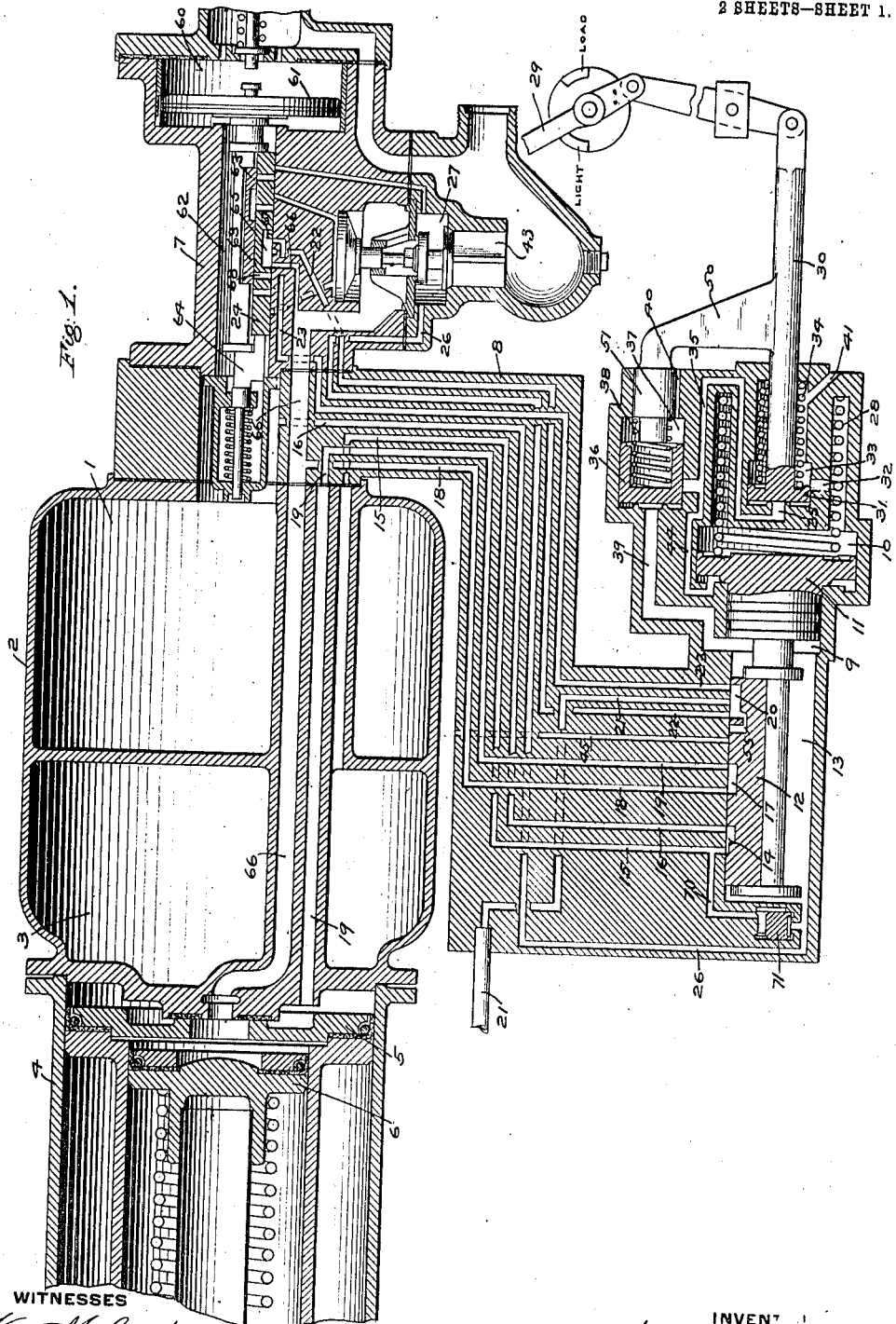

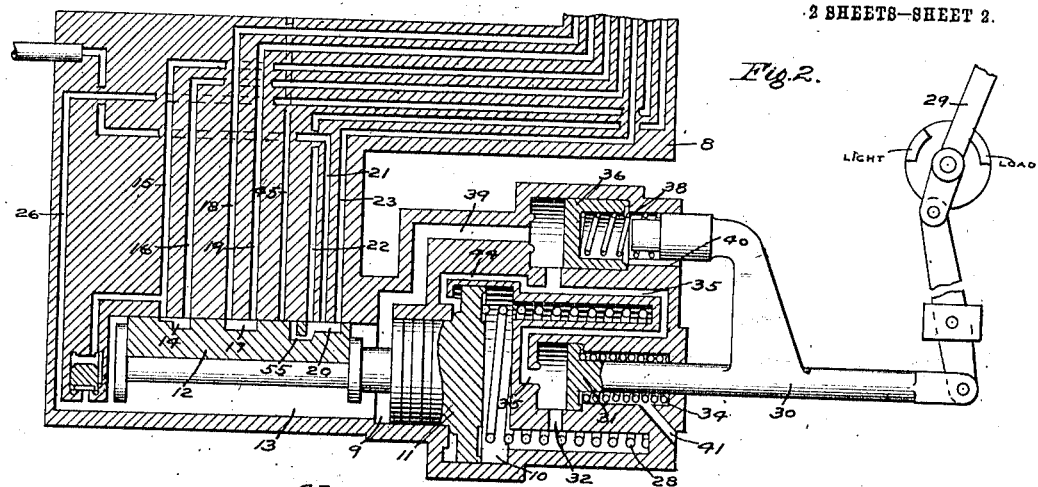
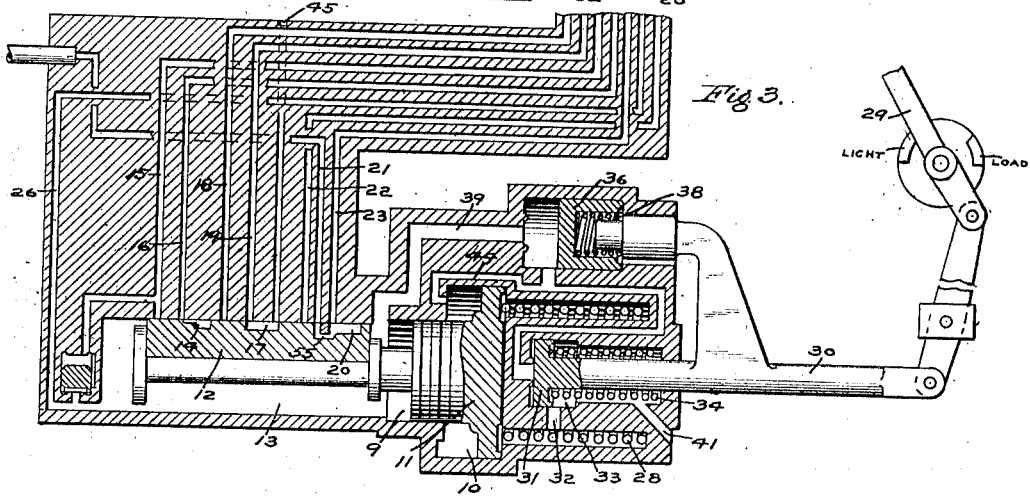
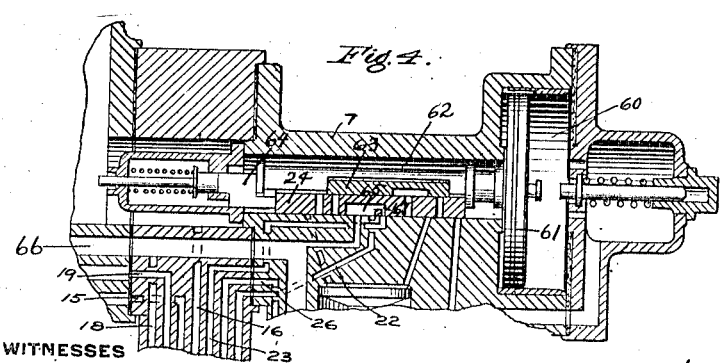

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

LOAD BRAKE DEVICE.

1,039,220.

Specification of Letters Patent. Patented Sept. 24, 1912.

Application filed November 20, 1908. Serial No. 463,607.

*To all whom it may concern:*

Be it known that I, WALTER V. TURNER, a citizen of the United States, residing at Edgewood, in the county of Allegheny and State of Pennsylvania, have invented new and useful Improvements in Load Brake Devices, of which the following is a specification.

This invention relates to fluid pressure brakes, and more particularly to a brake equipment adapted to give light or heavy braking power according as the car is light or loaded.

One object of my invention is to provide means for automatically adjusting the load brake apparatus for light or heavy braking at predetermined degrees of pressure in the brake system. According to this feature of my improvements, when the brake system becomes charged up to a certain predetermined degree of pressure, the load brake apparatus on each car of the train is automatically shifted to the light load position, so as to prevent excessive braking power and sliding of wheels on such empty cars as may have had the load brake apparatus inadventently left in load position. In a like manner, the present apparatus is adapted, whenever the pressure in the brake system becomes reduced to a certain predetermined degree, to automatically shift the load brake apparatus on those cars adjusted for light load braking to the position for obtaining heavy braking power and this feature gives needed assistance in many cases, for example, in operating on grades, should the pressure in the brake system become reduced to an undesired degree by reason of frequent brake applications, or otherwise, the braking power is correspondingly reduced in subsequent brake applications with the ordinary equipment, but with the present apparatus, by reason of the parts automatically going to the heavy load braking position on the light cars, the braking power of the train as a whole is considerably augmented.

Another object of my improvements, relating to load brake apparatus employed in connection with a triple valve device having the so-called retarded release feature, is to provide means for regulating the rate of brake cylinder release in the restricted and the full release positions to correspond with the adjustment of the load brake apparatus to the light or the heavy load position.

Still another object of my invention is to provide a load brake apparatus adapted to permit the employment of an ordinary triple valve device having usual sized ports as used in service.

In the accompanying drawing, Figure 1 is a central sectional view of a car air brake equipment embodying a preferred form of my improvements and showing the apparatus for adjusting the braking power according to the load, with its parts in the position assumed when the pressure in the brake system has reduced to a certain predetemined low degree or all the air is out of the system; Fig. 2 a similar view of the load brake adjusting portion of the above equipment, illustrating the positions assumed by the parts, with the brake system charged up to a certain predetermined pressure and the handle for manually controlling the apparatus in heavy load position; Fig. 3 a similar view, showing the parts with the system charged up to a certain pressure and the handle in the light load position; and Fig. 4 a central sectional view of the retarded release triple valve device employed in connection with the load brake apparatus, showing the parts in the retarded release position.

In order to obtain braking power on a car to correspond with either the light or the loaded condition of the car and at the same time maintain the relative capacity of reservoir and brake cylinder uniform in each case, employing a single triple valve device, it has heretofore been proposed to provide an additional reservoir adapted to be cut in with the usual auxiliary reservoir for heavy load braking, and an additional brake cylinder of a size to correspond with the combined reservoir capacity and therefore, while most of the features of my improvements are adapted to be employed with various other forms of load brake apparatus the invention is shown in the drawings applied to an apparatus of the above type, and comprises the usual auxiliary reservoir 1, additional reservoir 3, which may be united in one casing 2 with the auxiliary reservoir, and a large brake cylinder 4, corresponding in size with the combined volumes of the two reservoirs, and containing brake piston 5.

The large brake piston 5 forms the brake cylinder for the small or usual brake piston 6 which corresponds in capacity with the usual size auxiliary reservoir 1.

The triple valve device employed for controlling the fluid pressure in the brake cylinders is shown in the drawings with the so-called retarded release feature in order to illustrate certain features of my improvements, and comprises a casing 7 having piston chamber 60 containing triple valve piston 61 and valve chamber 62 containing main slide valve 24 and auxiliary valve 63 mounted on and having a movement relative to said main valve. The triple valve device is provided with a yielding resistance device 64 for opposing the movement of the parts from normal full release position in which cavity 65 in the main valve connects the brake cylinder port 66 with the exhaust port 23 to the retarded release position in which a restricted portion 67 of the cavity 65 connects said ports, so as to restrict the flow of air from the brake cylinder through the triple valve exhaust port.

The load brake controlling or change-over valve mechanism comprises a suitable casing 8, preferably interposed between the reservoir casing 2 and the triple valve casing 7 and provided with a differential piston chamber having chambers 9 and 10 of different areas for containing a differential piston 11.

Piston 11 controls the regulating or change-over slide valve 12 contained in valve chamber 13 and provided with a cavity 14 adapted to connect a port 15 leading to the reservoir 3 with port 16 leading to the auxiliary reservoir 1, cavity 17 adapted to connect port 18 leading to the small brake cylinder with port 19 leading to the larger brake cylinder, and a cavity 20 adapted to connect an atmospheric exhaust port 21 with ports 22 and 23 leading to the seat of the main slide valve 24 of triple valve device 7, in the heavy load position of the piston 11. The smaller area of piston 11 is constantly subject to the fluid pressure in valve chamber 13, which communicates through a passage 26 preferably with the emergency check valve chamber 27 of the triple valve device 7, so that said piston is subject to the pressure of the brake system at all times, it being understood that as the check valve 43 is never perfectly tight, even if the train pipe pressure reduces, the pressure in the check valve chamber 27, and consequently the pressure in the valve chamber 13 will also reduce by leakage around said check valve to the train pipe. The port 26 may also be utilized for recharging the additional reservoir 3 and for this purpose a passage 70 is provided which connects port 26 with port 15 leading to the additional reservoir and a non return check valve 71 is interposed in said passage to prevent back flow from the reservoir.

The opposite larger face of piston 11 is subject to the pressure of a spring 28. The mechanism for manually controlling the load brake apparatus comprises hand levers 29 disposed on opposite sides of the car and operatively connected in a suitable manner to a valve rod 30 for actuating a piston valve 31 which is adapted to control a port 32 leading from piston chamber 10 and opening into the piston valve chamber 33. The piston valve 31 is subject on one side to the pressure of a spring 34 which tends to maintain said piston valve at its inner position in which it seats so as to close a port 35 and also open the port 32.

The load brake apparatus is adapted to be automatically controlled by means of a loaded piston valve 36 contained in chamber 37 and subject to the pressure of a spring 38 tending to seat the same in its inner position. A port 39 leads from the valve chamber 13 to one face of the load valve 36, said valve being adapted to seat and restrict the area open to said port so that fluid pressure acts only on a certain reduced area of the valve 36 when in its seated position. The outer spring face of piston valve 36 is open to the atmosphere through a port 40 and the spring chamber of valve 31 is also open to the atmosphere through a port 41.

The spring 38 is adjusted to permit the valve 36 to open when the fluid in port 39 acting on the reduced area thereof attains a certain predetermined pressure, for example, 60 pounds, and in operation, when the brake system is charged up, air from the brake pipe flows past the emergency check valve 43 and through port 26 to valve chamber 13 and thence through port 39 to the piston valve 36. When the pressure rises to 60 pounds or other predetermined pressure the valve 36 is lifted off its seat and is shifted to its extreme outer position, in which it seats. Air is then admitted through port 35 and by means of a port 44 flows to the differential area of piston 11 so that the full area of the piston on one side is now subject to the pressure of the system. The opposite face of the piston is open to the atmosphere through ports 32 and 41, and as the fluid pressure acting on the full area of piston 11 exceeds the resistance of spring 28, the piston and valve 12 are shifted outwardly, the piston being adapted to seat in its outer position so that leakage to the atmosphere is prevented.

The change-over valve 12 is now in its light load position and communication is cut off between the two reservoirs and the two brake cylinders. In this light load position the cavity 17 connects port 19 with an exhaust port 45, so that the larger brake cylinder is open to the atmosphere, and accumulation of pressure on the brake cylinder piston 5 through leakage is thus prevented.

In applying the brakes with the change-over valve mechanism in light load position, the triple piston moves out and the usual service port 68 in the main slide valve is brought into register with the brake cylinder port 66 and air is supplied from the auxiliary reservoir 1 to the small brake cylinder.

The parts are maintained in the light load position so long as the pressure in the brake system is above a certain predetermined point.

The spring 38 having been adjusted to correspond with a fluid pressure of 60 pounds acting on only a portion of the area of piston valve 36, it will be seen that in its open position with the full area of the piston exposed to fluid pressure, it is necessary for the pressure to fall a certain amount below 60 pounds before the valve is returned by the spring, according to the relative full and seated areas of the valve. For example, the proportions may be such that the valve does not close until the pressure falls to say 40 pounds and then the valve moving to its inner seat closes port 39 and the fluid on the differential area of piston 11 flows through port 44 and around piston valve 36, which is made a loose fit for that purpose, to exhaust port 40. By thus making the pressure at which the piston valve 36 operates less than fifty pounds or other equalizing pressure, it will be seen that the parts are not operated by such reductions in train pipe pressure as are ordinarily made in effecting applications of the brakes. The fluid pressure then only acts on the smaller area of the piston 11, under which condition, the spring 28 has sufficient resistance to shift the parts to the inner heavy load position in which the reservoirs are connected, and the large brake cylinder is cut in. When the brakes are now applied or in case the brakes are already applied the braking power is increased to correspond with the larger reservoir and brake cylinder volumes, as will be understood.

On loaded cars the handle 29 is adjusted to the heavy load position and the piston valve 31 is thereby shifted to its outer seat, cutting off exhaust port 41 and opening communication from port 35 to port 32 and so admitting fluid from port 39 through ports 35 and 32 to the piston chamber 10 at the outer face of piston 11. The piston 11 is thereupon shifted to the heavy load position, making the connections hereinbefore described. The piston 11 is then maintained in its inner or heavy load position by the spring 28, the fluid pressures acting on the opposite faces of the piston being balanced. As so far described the piston valve 36 is adapted to seat when the pressure in the brake system reduces to 40 pounds, but if the manually controlled valve 31 is in its load position at that time, the port 35 being cut off from supply port 39, fluid on the inner face thereof would leak off through port 35 and exhaust port 40, so that the valve 31 is returned to its inner position and the piston 11 is opened to the exhaust port 41, consequently causing the parts to be shifted to the light load position. Then when the pressure in the brake system is again restored, the load brake apparatus on all the cars would be adjusted to the light load position and the braking power on the loaded cars would be the same as on the empty cars unless the brakemen reset the apparatus on loaded cars.

It is not desired in all cases to automatically reset the apparatus to the light position when the train pipe pressure falls, for instance, when the drop in pressure is only temporary and in order to maintain the apparatus on the loaded cars in heavy load position under the above conditions means are provided for reducing the amount of load acting on the valve 36 upon movement of the manually operated mechanism to load position and preferably consists of an arm 50 on the piston stem 30 having an abutment 51 against which the spring 38 is adapted to bear. Thus with the parts in light load position the tension of the spring 38 may be adjusted so as to permit the valve to open at 60 pounds as before, but upon shifting the piston rod 30 to the heavy load position, the spring 38 is elongated and thereby its resistance to the movement of the valve 36 is correspondingly reduced, and only at a considerably lower pressure, say 20 pounds, for example, is the spring able to return the piston valve 31 to its inner position. The manually operated mechanism is thus maintained in load position for ordinary changes in the pressure of the brake system and not until the pressure is reduced to 20 pounds or less is the same permitted to assume its inner light load position.

It will now be seen that with the handle in light load position, the parts are adjusted to give light braking power and with the handle in heavy load position the parts are adjusted to give heavy braking power, but when the pressure in the system falls to a certain predetermined point, those cars adjusted to the light position are automatically set to the heavy load position, the loaded cars remaining set to loaded position, thus giving an increased braking power for the train upon applying the brakes, and when the pressure of the system is restored, those cars originally adjusted to light load position are automatically reset to that position while those equipments originally adjusted to the heavy load position remain in that position. When the pressure in the system reduces to a low degree or entirely leaks off the piston 11 is substantially balanced as to fluid pressure so that the spring 28 shifts the piston to its load position, and the fluid leaking off from the manually controlled valve 31, permits the spring 34 to shift the handle 29 to light load position. Upon connecting up the several cars in a train, when the brake system becomes charged to the predetermined pressure the parts are shifted to light load position, and the brakeman may then adjust the handles 29 on the loaded cars to heavy load position to secure the increased braking power on the loaded cars.

Where a triple valve device having the retarded release feature is employed with a load brake apparatus it is an important feature of my improvements to provide means for securing a relative rate of release both in the normal and in the retarded release positions corresponding with the adjustment of the equipment to the light or heavy load position. For this purpose the brake cylinder exhaust is controlled by the change-over valve 12, the exhaust port 23 being of such size as to permit a rate of release corresponding with that of the usual retarded release equipment and this port is constantly open through large cavity 20 in the slide valve 12 to exhaust port 21. In the heavy load position, however, an additional port 22 is connected by the cavity 20 with the exhaust port 21, so that the rate of release when the parts are set to the load position is increased so as to correspond with the larger brake cylinder volume, and thereby permit the release on loaded cars to take place in substantially the same time as on the light cars. When the valve 12 is in its light load position, the additional port 22 is cut off and port 23 and exhaust port 21 are connected through an extension 55, of restricted area, of the cavity 20, so that the rate of release in both full and restricted release positions of the triple valve device corresponds with the ordinary small brake cylinder volume.

It is highly desirable to be able to employ an ordinary triple valve device having the usual size ports in connection with load brake apparatus, but on account of the large volume of the combined reservoirs, the decrease in reservoir pressure by the flow of air to the brake cylinder in service applications is at a less rate through the usual service port of the triple valve than that at which the brake pipe pressure reduces, so that there is some liability, by reason of the preponderating auxiliary reservoir pressure thus brought about, of the triple valve parts going to emergency application position and thereby causing undesired quick action. To obviate this tendency one feature of my improvements contemplates restricting the flow of air from the additional reservoir when the same is cut in for heavy load braking to a degree less than the flow through the triple valve service port from the auxiliary reservoir to the brake cylinder, thus insuring that the rate of reduction of pressure on the auxiliary reservoir side of the triple valve piston will be sufficient to prevent possible movement of the parts to emergency position. Preferably this is accomplished by restricting the port area of cavity 14 in the change-over valve 12, so that the flow of air from the additional reservoir through port 15 and port 16 is retarded the desired amount.

I have designed the apparatus so that the usual large brake cylinder passage 66 supplies air to the brake cylinders both in light and in heavy load braking and consequently the ports 18 and 19 and cavity 17 may be of small size, as it is only necessary by this arrangement to supply sufficient air through the port 19 to the large brake cylinder to lift the same from its seat, the large piston being then open on its full area to the supply of air coming through the main brake cylinder passage 66. In some cases, in fact, I may only close off port 19 from the atmosphere in shifting the change-over valve and depend upon leakage past the brake cylinder seat for producing the lifting pressure against the large brake piston.

Having now described my invention, what I claim as new and desire to secure by Letters Patent, is:—

1. In a fluid pressure brake, the combination with an apparatus adapted to be adjusted to a light braking position or to a heavy braking position, of means operated upon a predetermined reduction in the pressure in the brake system for setting said apparatus to its heavy braking position.

2. In a fluid pressure brake, the combination with an apparatus adapted to be adjusted to a light braking position or to a heavy braking position, of means automatically operating upon a partial reduction in the pressure of the brake system for setting the apparatus to its heavy braking position.

3. In a fluid pressure brake, the combination with an apparatus adapted to be adjusted to a light braking position or to a heavy braking position, of means automatically operated upon a predetermined increase in the pressure of the brake system to a degree less than the normal pressure carried in the system for setting the apparatus to its light braking position and upon a decrease in the pressure of the brake system for adjusting the apparatus to its heavy braking position.

4. In a fluid pressure brake, the combination with apparatus for applying the brakes, of means operating upon a predetermined decrease in the pressure of the brake system for increasing the force of a brake application.

5. In a fluid pressure brake, the combination with apparatus adapted to be adjusted for light braking power and for heavy braking power, of means operating according to the degree of pressure in the system for adjusting said apparatus from the light to the heavy braking position.

6. In a fluid pressure brake, the combination with an apparatus for producing light braking power and heavy braking power, of means operating upon a predetermined reduction in the pressure of the system for shifting said apparatus from its light to its heavy load position.

7. In a fluid pressure brake, the combination with an apparatus for producing light braking power and heavy braking power, of means operating upon increase of pressure in the brake system for shifting said apparatus to its light load position and upon a decrease of pressure to its heavy load position.

8. In a fluid pressure brake, the combination with a quick action triple valve device and an apparatus for giving either light and an apparatus for giving either light braking power or heavy braking power, of a valve device subject to the fluid pressure in the emergency check valve chamber for moving said valve device to heavy braking position when the pressure in said check valve chamber becomes depleted and to light braking position when the pressure is increased.

9. In a fluid pressure brake, the combination with a valve device adapted to be adjusted for light load braking and for heavy load braking, of a manually operated device for varying the fluid pressure on said valve device and a load valve means for also controlling the fluid pressure for operating said valve device, said load valve means being adapted to open at a predetermined degree of pressure in the brake system and close at a different degree of pressure.

10. In a fluid pressure brake, the combination with a valve device adapted to be adjusted for light load braking and for heavy load braking, of a load valve means for controlling the fluid pressure for operating said valve device, said load valve means being adapted to open and supply fluid to actuate said valve device at a predetermined pressure in the brake system and close at a less pressure and manually operated means for controlling communication through which said load valve means supplies fluid to said valve device.

11. In a fluid pressure brake, the combination with an apparatus for producing either light load braking or heavy load braking, of manually actuated means for adjusting said apparatus and means governed by the pressure of the brake system for automatically operating said apparatus.

12. In a fluid pressure brake, the combination with an apparatus for producing either light load braking or heavy load braking, of manually operated means for adjusting said apparatus to the light and heavy load positions, a loaded valve means governed according to the degree of pressure in the brake system for automatically operating said apparatus, and means controlled by the movement of said manually operated means for varying the amount of the load acting on said valve means.

13. In a fluid pressure brake, the combination with a valve device adapted to be adjusted to give either light load braking or heavy load braking, and manually operated means for effecting the adjustment of said valve device, of a loaded valve for controlling fluid pressure on said valve device to operate the same automatically, and means governed by the movement of the manually operated means for adjusting the amount of the load acting on said loaded valve.

14. In a fluid pressure brake, the combination with a valve device adapted to be adjusted to give either light load or heavy load braking, and manually operated means for effecting the adjustment of said valve device, of a loaded valve for varying the fluid pressure on said valve device to operate the same automatically, and means operating upon the movement of the manually operated means to its heavy load braking position for reducing the amount of the load acting on said loaded valve.

15. In a fluid pressure brake, the combination with an apparatus adapted to be adjusted for light load braking and for heavy load braking and a retarded release triple valve device having a normal full release position and a position in which the flow of air from the brake cylinder through the exhaust port is restricted, of means for regulating the rate at which fluid is released from the brake cylinder in both release positions corresponding with load adjustment of said apparatus.

16. In a fluid pressure brake, the combination with an apparatus adapted to be adjusted to give brake cylinder and reservoir capacity according as the car is light or heavy, of a retarded release valve mechanism having a full release position and a retarded release position in which the exhaust from the brake cylinder is restricted and means for regulating the rate of release in both release positions to correspond with the adjustment of said apparatus to either the light or the heavy load position.

17. In a fluid pressure brake, the combination with an auxiliary reservoir, an additional reservoir, and means for cutting in said additional reservoir for heavy load braking, of means for restricting the flow of air from said additional reservoir in applying the brakes.

18. In a fluid pressure brake, the combination with a train pipe, auxiliary reservoir, triple valve, and brake cylinder, of an additional reservoir, means for cutting said additional reservoir in or out for heavy or light load braking respectively, and means for retarding the flow of air from the additional reservoir in applying the brakes in heavy load braking.

19. In a fluid pressure brake, the combination with a train pipe, auxiliary reservoir, triple valve, and brake cylinder, of an additional reservoir, a valve mechanism for cutting said additional reservoir in with the auxiliary reservoir for heavy load braking and means for restricting the flow of air from the additional reservoir.

20. In a fluid pressure brake, the combination with a train pipe, triple valve, brake cylinder, and auxiliary reservoir, of an additional brake cylinder adapted to be cut in for heavy load braking, said triple valve being adapted to supply air to either brake cylinder through the same outlet port.

21. In a fluid pressure brake, the combination with a train pipe, triple valve, auxiliary reservoir, and brake cylinder having permanent communication with a supply passage from the triple valve, of an additional brake cylinder open to the atmosphere in light load braking and means for closing said atmospheric communication and for admitting air to the additional brake cylinder through said supply passage in applying the brakes in heavy load braking.

22. In a fluid pressure brake, the combination with a train pipe, triple valve, auxiliary reservoir, and brake cylinder having a main air supply port constantly communicating therewith, of an additional brake cylinder and means for connecting said brake cylinder with the atmosphere in light load braking and with the main air supply passage in heavy load braking, said triple valve being adapted to supply air through said main supply passage to the additional brake cylinder in heavy load braking.

23. In a fluid pressure brake, the combination with an apparatus adapted to be adjusted either for light load braking or for heavy load braking, of valve means governed by the pressure in the brake system for effecting the adjustment of said apparatus and a manually operated device for also effecting the adjustment of said apparatus, said valve means being operated upon a predetermined reduction in the pressure of the system to cause the shifting of the apparatus from light load to heavy load position and upon a further reduction in pressure to cause the shifting of said manually operated device from heavy to light load position.

24. In a fluid pressure brake, the combination with valve means adapted to be adjusted to effect light load braking in one position and heavy load braking in another position and a movable abutment for operating said valve means, of a valve device subject on one side to the pressure of the brake system and operating upon a predetermined reduction in pressure to vary the fluid pressure on one side of said abutment and thereby shift said valve means from light to heavy load position and a manually operated device for also varying the fluid pressure on said abutment to operate the same, said valve device being adapted in one position to effect the shifting of said manually operated device from heavy to light load position.

In testimony whereof I have hereunto set my hand.

WALTER V. TURNER.

Witnesses:
Wm. M. Cady,
A. M. Clements.